United States Patent [19]
Nagaoka et al.

[11] Patent Number: 4,945,378
[45] Date of Patent: Jul. 31, 1990

[54] CIRCUIT FOR DETECTING BACK LIGHT

[75] Inventors: Shinji Nagaoka; Yoichi Seki; Hiroyuki Saito; Michio Taniwaki, all of Yotsukaido, Japan

[73] Assignee: Seikosha Co., Ltd., Japan

[21] Appl. No.: 290,451

[22] Filed: Dec. 27, 1988

[30] Foreign Application Priority Data

Dec. 29, 1987 [JP] Japan .................... 62-336678

[51] Int. Cl.⁵ ............................................. G03B 7/08
[52] U.S. Cl. .................................. 354/429; 354/430; 354/432
[58] Field of Search ............... 354/429, 430, 431, 432, 354/433, 434

[56] References Cited

U.S. PATENT DOCUMENTS

| | | | |
|---|---|---|---|
| 4,690,536 | 9/1987 | Nakai et al. | 354/432 |
| 4,746,949 | 5/1988 | Takei et al. | 354/429 |
| 4,809,031 | 2/1989 | Sakaguchi et al. | 354/429 |
| 4,821,074 | 4/1989 | Nakai et al. | 354/429 |

*Primary Examiner*—Russell E. Adams
*Attorney, Agent, or Firm*—Bruce L. Adams; Van C. Wilks

[57] ABSTRACT

A circuit for detecting back light comprises a time constant circuit including a capacitor selectively connectable in series with either a resistive element, or one of two CdS photoconductive elements used to measure the central and surrounding portions, respectively, of an object being photographed. Three switches separately conect the resistive element and the two photoconductive elements in series with the capacitor. A circuit generates pulses for a length of time governed by a time constant determined by the time constant circuit, and three separate counters store the pulses the number of which is determined by the time constant. An arithmetic circuit processes the pulses stored in the counters to determine the amount of back light present on the object.

6 Claims, 4 Drawing Sheets

CIRCUIT FOR DETECTING BACK LIGHT

DETAILED DESCRIPTION OF THE INVENTION

1. Industrial Field of Utilization

The present invention relates to a circuit used in a camera or the like to detect back light.

2. Prior Art Techniques

A conventional circuit for detecting back light is shown in FIG. 8. The circuit comprises photodiodes 29 and 30 both of which consist of silicon. The photodiode 29 responds to the brightness of the central portion of the object to be photographed. The photodiode 30 responds to the brightness of the surrounding portion of the object. Their output currents which are proportional to the brightness are supplied to current-to-voltage converter circuits 31 and 32 to convert the currents into voltages. A pulse-generating circuit 33 produces pulses of a pulse duration corresponding to its input voltage. First, the output from the converter circuit 32 is selected by the switching circuit 34 and fed to the pulse-generating circuit 33. That is, a current corresponding to the brightness of the surrounding portion of the object is converted into a voltage and supplied to the pulse-generating circuit 33. When a trigger signal arrives at terminal p, the pulse-generating circuit 33 generates pulses having a pulse duration proportional to the brightness. The pulse duration is measured by a counter circuit (not shown) or the like. The measured value is regarded as indicating the brightness of the surrounding portion of the object.

Then, the converter circuit 31 is selected by the switching circuit 34. The output current from the photodiode 30 is converted into a pulse duration in the same manner as the foregoing. Thus, the brightness of the central portion of the object is recognized.

The pulse duration proportional to the brightness is calculated by an arithmetic circuit (not shown). If it is determined that the central portion of the object is darker than the surrounding portion or that the brightness is below a certain level, then back light is judged to be detected. Then, a strobe is flashed to prevent the central portion from being dark.

3. Problems to be Solved by the Invention

The aforementioned configuration uses relatively expensive photodiodes of silicon. Since the output currents from the photodiodes are very weak, amplifier circuits or the like handling the weak currents is needed. Also, a dedicated photometric IC independent of a central-processing unit (CPU) is necessitated.

However, it is difficult to completely suppress variations of constants among parts and characteristic variations due to temperature changes. For these reasons, it has been unavoidable that the photometric accuracy decreases.

The present invention has been made in view of the foregoing problems. The invention is intended to provide a simplified circuit configuration and improve photometric accuracy.

4. Means for Solving the Problems

The present invention resides in a circuit for detecting back light, the circuit comprising: switching circuits for selectively connecting a reference resistive element, a first photoconductive device responding to the brightness of the surrounding portion of an object to be photographed, and a second photoconductive device responding to the brightness of the central portion of the object with a time constant circuit to determine the time constant; a pulse-generating circuit that receives the output from the time constant circuit and produces pulses the number of which corresponds to the resistance value of the device connected by one of the switching circuits; a counter circuit for counting the number of pulses delivered from the pulse-generating circuit; and an arithmetic circuit for comparing the magnitude of the ratio of the total count obtained by the counter circuit when the first photoconductive device is connected to the total count obtained when the reference resistive element is connected, with the magnitude of the ratio of the total count obtained when the second photoconductive device is connected to the total count obtained when the reference resistive element is connected.

1: first photoconductive device;
2: second photoconductive device;
3: reference resistive element;
4: time constant circuit;
8–10: switching circuits;
11: pulse-generating circuit;
12A–12C: counter circuits;
13: arithmetic circuit;
17: time constant circuit;
22: pulse-generating circuit;
24: time constant circuit;
28: pulse-generating circuit

EMBODIMENT

Figure 1:
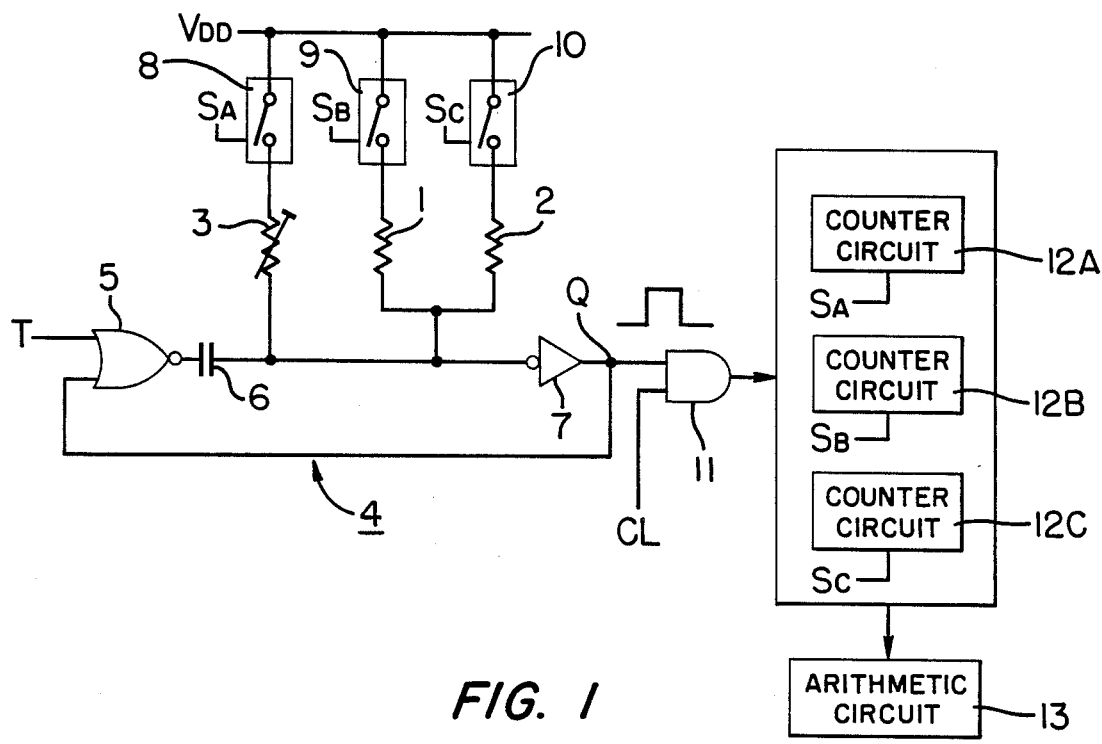
FIG. 1 is a diagram of an electric circuit according to the invention.

Referring to FIG. 1, a time constant determining device comprises a first photoconductive device or first photoconductive means 1 which responds to the brightness of the surrounding portion of an object to be photographed, a second photoconductive device or second photoconductive means 2 which responds to the brightness of the central portion of the object (in the present example, these devices are made from CdS and are equal in area of light-sensitive surface), and is a reference resistive element 3. In this example, the resistive element 3 consists of a variable resistor. A time constant circuit, used to determine a time constant 4 constitutes a one-shot multivibrator, and comprises a gate circuit 5, a capacitor 6, and an inverter 7. The combination of the capacitor 6 and any one of the photoconductive devices 1, 2, and the resistive element 3 determines the time constant. Switching circuits means 8–10 selectively comprise means for connecting the photoconductive devices 1, 2, and the resistor 3 to the time constant circuit 4 to determine the time constant. A gate circuit 11 forms a pulse-generating circuit or pulse-generating means and has an input terminal CL to which clock pulses are supplied. Counter circuits 12A-12C count the number of pulses delivered from the pulse-generating circuit or pulse generating means 11. An arithmetic circuit or arithmetic means 13 performs arithmetic operations as described below.

Figure 2:
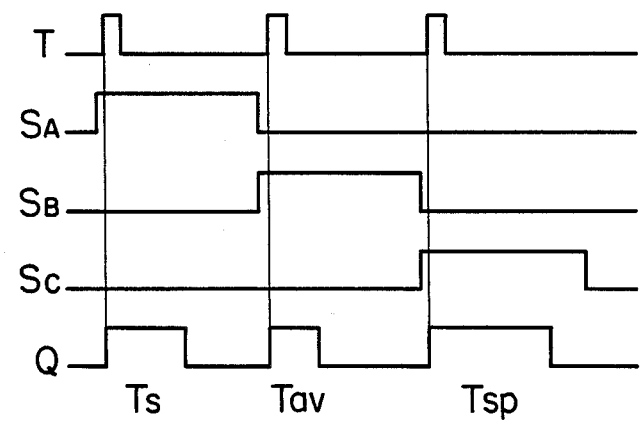
FIG. 2 is a time chart for illustrating the operation of the circuit shown in FIG. 1.

In the operation, immediately before a signal T (FIG. 2) that triggers the time constant circuit 4 is produced, a pulse $S_A$ (FIG. 2) is generated to turn on a switching circuit means $S_A$. Then, the resistor 3 is connected to the time constant circuit 4. Subsequently, the triggering signal T is produced to cause the inverter 7 to produce pulses Q (FIG. 2) having a pulse duration $T_s$ that is determined by the resistance value $R_{Lvr}$ of the resistive element 3 and the capacitance of the capacitor 6. When these pulses are being produced, the pulse-generating circuit 11 produces clock pulses which are supplied to the counter circuit 12A and counted.

The pulse duration $T_s$ is given by $$R_{vr} \cdot C \cdot \ln(V_e - V_{th})/V_e$$

where C is the capacitance of the capacitor 6, $V_e$ is the source voltage, and $V_{th}$ is the threshold voltage of the inverter 7. Therefore, the duration is proportional to the resistance $R_{vr}$ of the resistive element 3.

Then, a pulse $S_B$ (FIG. 2) turns on the switching circuit means 9, connecting the photoconductive device 1 to the time constant circuit 4. Thereafter, a triggering signal is produced. At that time, the inverter 7 produces a pulse Q (FIG. 2) having a pulse duration $T_{av}$ corresponding to the brightness of the surrounding portion of the object to be photographed. While this pulse persists, clock pulses are fed to the counter circuit 12B, and the number is counted. The pulse duration $T_{av}$ is given by $$R_{av} \cdot C \cdot \ln(V_e - V_{th})/V_e$$

where $R_{av}$ is the resistance of the photoconductive device 1.

Then, a pulse $S_C$ (FIG. 2) turns on the switching circuit means 10 to thereby connect the photoconductive device 2 to the time constant circuit 4, after which a triggering signal is generated. At this time, a pulse Q (FIG. 2) of a pulse duration $T_{sp}$ corresponding to the brightness of the central portion of the object is produced. While this pulse persists, clock pulses are furnished to the counter circuit 12C, and the number of the pulses is counted. The pulse duration $T_{sp}$ is given by $$R_{sp} \cdot C \cdot \ln(V_e - V_{th})/V_e$$

where $R_{sp}$ is the resistance of the photoconductive device 2.

The arithmetic circuit or arithmetic means 13 performs arithmetic operations in the manner described now. First, the ratio of the pulse duration $T_{av}$ obtained when the photoconductive device 1 is connected to the pulse duration $T_s$ obtained when the reference resistive element is connected is calculated to find the brightness of the surrounding portion of the object. This ratio $T_{av}/T_s$ is equal to the ratio of the resistance $R_{av}$ of the photoconductive device 1 to the resistance $R_{vn}$ of the photoconductive device 3, i.e., $R_{av}/R_{vr}$.

Then, the ratio of the pulse duration $T_{sp}$ derived when the photoconductive device 2 is connected to the pulse duration $T_s$ obtained when the reference resistive element is connected is calculated to find the brightness of the central portion of the object. This ratio $T_{sp}/T_s$ equals the ratio $R_{sp}/R_{vr}$, i.e., the ratio of the resistance $R_{sp}$ of the photoconductive device 2 to the resistance $R_{vr}$ of the resistive element 3.

Since the capacitance of the capacitor 6, the power voltage $V_e$, and the threshold voltage $V_{th}$ are canceled out, the aforementioned ratios depend only on the resistance values of the resistive element 3 and the photoconductive device 1. Consequently, the ratios are affected by none of variations of the power voltage, the threshold voltage changing in response to the power voltage, capacitance variations due to the aging of the capacitor and temperature variations, and other changes.

The magnitude of a ratio $T_{av}/T_s$ representing the brightness of the surrounding portion of the object is compared with the magnitude of a ratio $T_{sp}/T_s$ expressing the brightness of the center to determine whether the light is back light. According to the result, a strobe is caused to emit light, or another operation is performed.

The resistance value of the resistive element 4 is so adjusted that it equals the resistance value of the photoconductive element at an appropriate brightness.

In the above example, the light incident surface of the photoconductive devices 1 and 2 are equal in area. It has been assumed that if they receive light of the same brightness, they show the same value of resistance. It is also possible that the two light incident surfaces differ in area. In this case, the period of the clock pulses is switched to another value according to the ratio of one area to the other area. In particular, when the pulse durations $T_s$ and $T_{av}$ are counted, the first reference clock pulses are used. When the pulse duration $T_{sp}$ is counted, the second clock pulses are employed. In case the ratio of the resistance of the photoconductive device 1 to the ratio of the resistance of the photoconductive device 2 is 1:4, for example, the ratio of the period of the first clock pulses to the period of the second clock pulses is set to 1:4.

Figure 3:
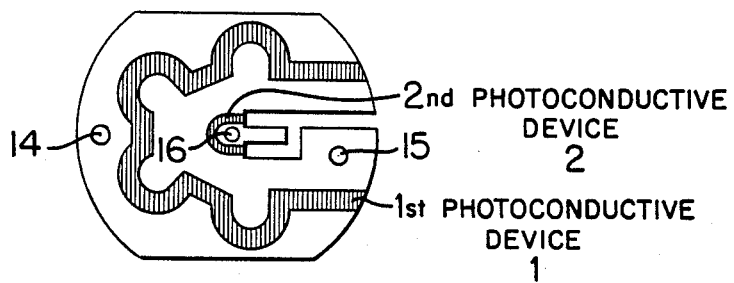
FIG. 3 is a front elevation of an example of photoconductive device.

The photoconductive devices 1 and 2 are built as shown in FIG. 3. The photoconductive device 2 consisting of CdS responds to the brightness of the central portion of an object to be photographed. The device 2 is formed in the center of a cell. The photoconductive device 1 which consists of CdS and responds to the brightness of the surrounding portion of the object is formed in the surrounding portion. Also electrodes 14-16 are formed. Of these electrodes, the electrode 15 is a common electrode.

In this example, the two devices of CdS are formed in one cell in one manufacturing step and, therefore, their γ characteristics which determine the relation between amount of light and resistance value can be made substantially equal.

The invention is not limited to this example. It is also possible to form devices of CdS in separate cells.

Figure 4:
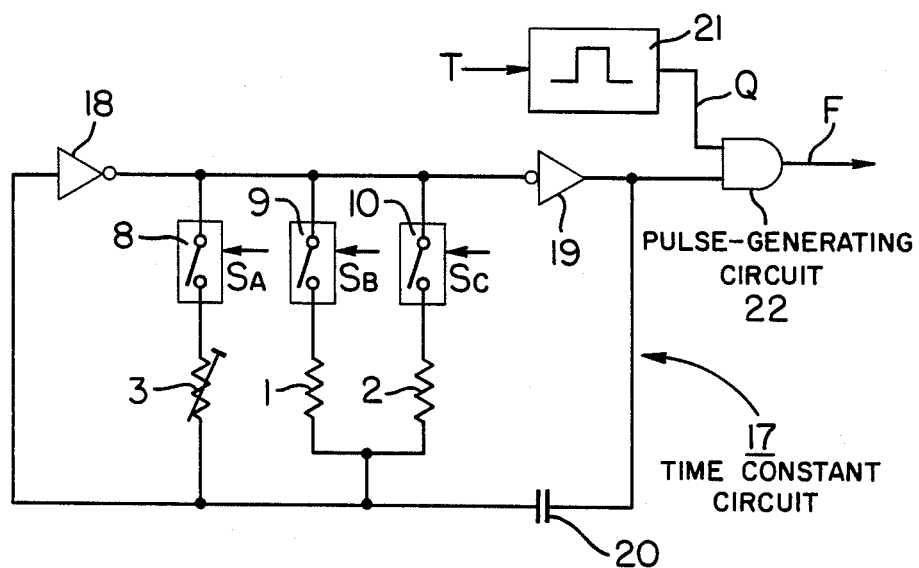
FIG. 4 is a diagram of another electric circuit according to the invention.

We now describe an example in which the brightness of an object to be photographed is converted into an oscillation frequency to detect back light. Referring to FIG. 4, a time constant circuit 17 constitutes a CR oscillator, and comprises inverters 18, 19, and a capacitor 20. A reference resistive element 3 and photoconductive devices 1 and 2 are selectively connected to the circuit to determine the time constant. A one-shot multivibrator 21 produces pulses of a given duration. A pulse-generating circuit 22 consists of a gate circuit whose output is supplied to a counter circuit similar to the counter circuit shown in FIG. 1.

It is to be noted that like components are denoted by like reference numerals in both FIGS. 1 and 4.

In the operation, three triggering pulses T (FIG. 5) are supplied to the input terminal T of the one-shot multivibrator 21. This multivibrator delivers pulses Q (FIG. 5) of a given duration T.

Figure 5:
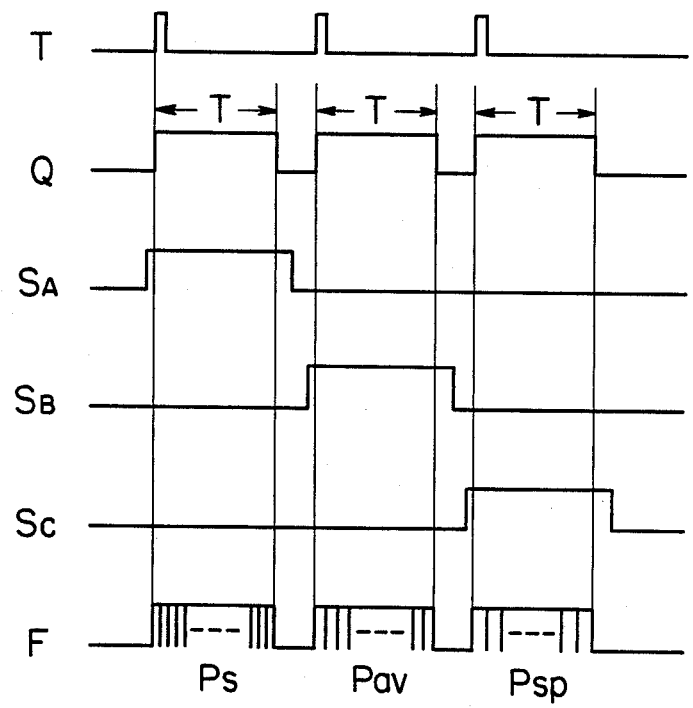
FIG. 5 is a time chart for illustrating the operation of the circuit shown in FIG. 4.

The switching circuits 8, 9, 10 are successively turned on by pulses $S_A$, $S_B$, $S_C$, respectively, shown in FIG. 5. When the switching circuit 8 is turned on, the resistive element 3 is connected to the time constant circuit 17, thus enabling oscillation. The oscillation frequency is determined by the resistive element 3 and the capacitor 20. While the one-shot multivibrator 21 is producing pulses during periods T, the generated output is allowed to pass through the pulse-generating circuit 22. The number of pulses $P_s$ is counted.

The switching circuit 9 is then turned on to connect the photoconductive device 1 with the time constant circuit 17. The circuit generates a frequency which is determined by the resistive value and the capacitor 20. The generated output passes through the pulse-generating circuit 22 during periods T in the same manner as the foregoing. The number of pulses $P_{av}$ is counted.

Subsequently, the switching circuit 10 is turned on to connect the photoconductive device 2 with the time constant circuit 17, which then generates signals. The oscillation frequency is determined by the resistance value and the capacitor 20. The generated output passes through the pulse-generating circuit 22 during periods T in the same way as the foregoing. The number of pulses $P_{sp}$ is counted.

The ratios of the pulse numbers $P_{av}/P_s$ and $P_{sp}/P_s$ are calculated. These two ratios are compared in magnitude to detect back light.

The relation of the compared ratios $P_{av}/P_s$ and $P_{sp}/P_s$ to the brightness is now described. Assuming that the capacitance of the capacitor 20 is constant, the oscillation frequency f of the time constant circuit 17 is given by $$f = 1/KR$$

where K is a constant, and R is the resistance value selected by the switching circuits 8–10.

The relations of the resistance values $R_{av}$, $R_{sp}$ of the photoconductive devices 1 and 2 to the brightness of the object to be examined are given by $$R_{av} = R_o \cdot 2^{\gamma n}$$

$$R_{sp} = R_o \cdot 2^{\gamma n}$$

where n is the brightness index, $\gamma$ is a constant determined by the $\gamma$ characteristics of the photoconductive device 1 or 2, and $R_o$ is the resistance value of the photoconductive device 1 or 2 at a certain brightness at which n=0.

The relationsip of the number of pulses P passing through the pulse-generating circuit 22 to the oscillation frequency f is given by $$P = Tf = T/KR$$

where T is the pulse duration of the output from the one-shot multivibrator 21.

The value of the reference resistor 3 is so set that the resistance $R_s$ of the resistive element 3, the resistances $R_{av}$, $R_{sp}$ of the photoconductive devices 1, 2 satisfy the relation $R_s = R_{av} = R_{sp}$ at a certain brightness. Under this condition, the ratios $P_{av}/P_s$ and $P_{sp}/P_s$ are given by $$P_{av}/P_s = P_{sp}/P_s = (T/K \cdot R_o 2^{\gamma n})/(T/K \cdot R_s) = 1/2^{\gamma n}$$

Therefore, if the $\gamma$ characteristics of the photoconductive devices 1 and 2 are known, then the brightness indices of the surrounding portion and the central portion of the object can be calculated from the ratios $P_{av}/P_s$ and $P_{sp}/P_s$. If the relation $P_{av}/P_s > P_{sp}/P_s$ holds, then it follows that the brightness of the surrounding portion of the object is higher than the central portion, indicating back light.

In this example, the capacitor 20 can have a small capacitance, for example of the order of 50 pF. This permits the device to be fabricated in the form of an integrated circuit. Where it is not built as an integrated circuit, inexpensive devices can be used.

Figure 6:
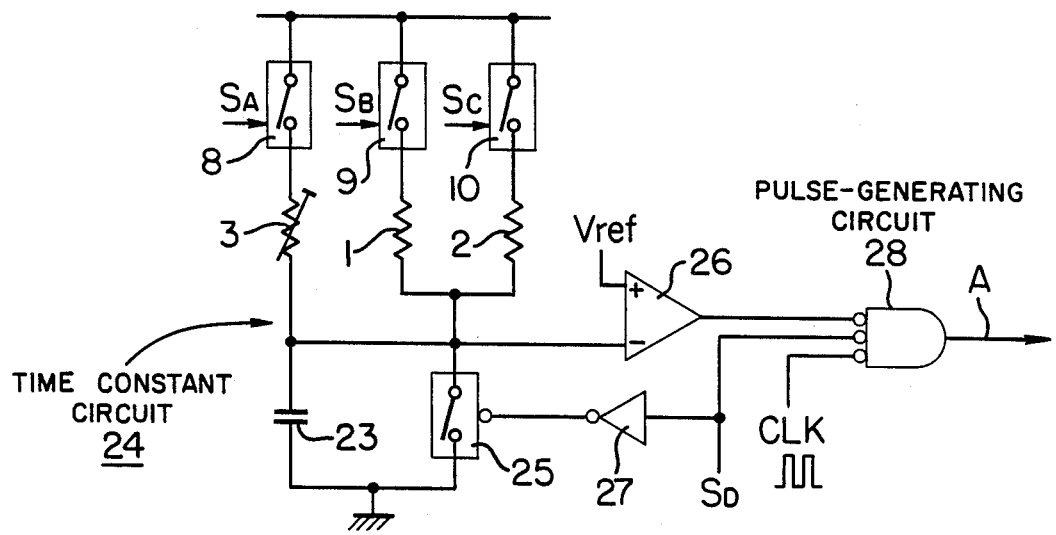
FIG. 6 is a diagram of a further electric circuit according to the invention.

FIG. 6 shows a further example. In this figure, a capacitor 23 constitutes a time constant circuit 24. A switching circuit 25 discharges the capacitor 23. A reference voltage $V_{ref}$ is applied to one input of a comparator 26. Indicated by numeral 27 is an inverter. A pulse-generating circuit 28 consists of a gate circuit whose output is supplied to a counter circuit similar to the counter circuit shown in FIG. 1.

It is to be noted that like components are denoted by like reference numerals in both FIGS. 1 and 6.

Figure 7:
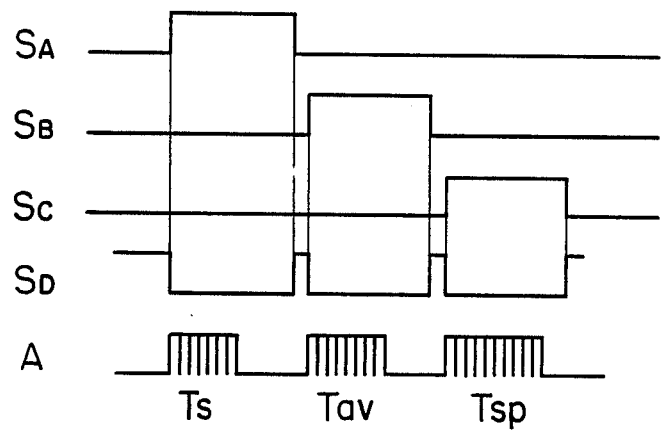
FIG. 7 is a time chart for illustrating the operation of the circuit shown in FIG. 6.
Figure 8:
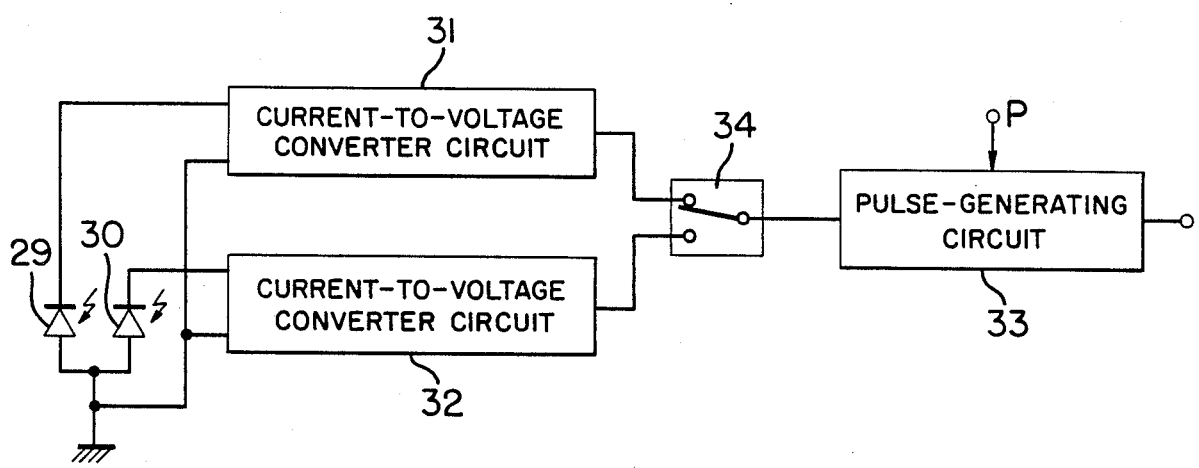
FIG. 8 is a diagram of an electric circuit showing a conventional back light-detecting circuit.

In the operation, pulses $S_A$–$S_C$ (FIG. 7) are successively supplied to the switching circuits 8–10, respectively. When none of these pulses are produced, signal "1" is applied to terminal $S_D$ as shown in FIG. 7. Normally, the switching circuit 25 operates to discharge the capacitor 23.

Supply of the pulse $S_A$ (FIG. 7) turns on the switching circuit 8. Simultaneously, the switching circuit 25 is turned off. Thus, the capacitor 23 is recharged with a time constant determined by the capacitance of the capacitor and the resistance of the resistive element 3. The comparator 26 produces a pulse of level 0 having a pulse duration equal to the time $T_s$ taken for the voltage across the capacitor to reach the reference voltage $V_{ref}$. While this pulse persists, the pulse-generating circuit 28 generates clock pulses A (FIG. 7). The clock pulses are supplied to the counter circuit. The pulse duration $T_s$ is measured.

When the pulse from the terminal $S_A$ ceases, the switching circuit 25 is turned on to discharge the capacitor 23.

When the switching circuit 9 is turned on, the capacitor 23 is recharged with a time constant determined by the photoconductive device 1 and the capacitor 23. Then, the comparator 26 produces a pulse having a pulse duration $T_{av}$ corresponding to the brightness of the surrounding portion of the object. While this pulse persists, the pulse-generating circuit 28 produces clock pulses, and the pulse duration $T_{av}$ is measured.

Then, the switching circuit 25 is turned on in the same manner as the foregoing. After the capacitor 23 is discharged, the switching circuit 10 is turned on. This recharges the capacitor 23 with a time constant determined by the photoconductive device 2 and the capacitor 23. Then, the comparator 26 produces a pulse $T_{sp}$ having a pulse duration $T_{sp}$ corresponding to the brightness of the central portion of the object. While this pulse persists, the pulse-generating circuit 28 generates clock pulses, and the pulse duration $T_{sp}$ is measured.

The ratios $T_{av}/T_s$ and $T_{sp}/T_s$ are calculated from the results of the measurements. These two ratios are compared in magnitude to detect back light.

Effects of the Invention

In accordance with the present invention, the effects of constants of circuit elements, variations of the power voltage due to aging, and temperature variations can be eliminated. This allows back light to be detected with improved accuracy. Therefore, inexpensive CdS can be used. Also, amplifier circuits which treat quite weak electric currents can be dispensed. The novel circuit can be incorporated in a logic IC such as a microcomputer. Consequently, the circuit configuration is made simple. Hence, a reduction in the cost can be achieved.

What is claimed is:

1. A circuit for detecting back light, comprising:
a time constant determining device comprising a first photoconductive device for outputting a first signal representative of a first resistance value proportional to the brightness of the surrounding portion of an object to be photographed, a second photoconductive device for outputting a second signal representative of a second resistance value proportional to the brightness of the central portion of the object, and a reference resistive element for use in outputting a reference signal representative of a reference resistance value;
a time constant circuit selectively receptive of the first, second and reference signals for determining a time constant and for producing a corresponding output signal;
switching circuit means for selectively connecting said time constant determining device to said time constant circuit;
a pulse-generating circuit for receiving the output signal from the time constant circuit and producing pulses the number of which corresponds to the resistance value of said time constant determining device connected by the switching means;
a counter circuit for counting the number of pulses delivered from the pulse-generating circuit; and
an arithmetic circuit for comparing the magnitude of the ratio of the total count obtained by the counter circuit when the first photoconductive device is connected to said time constant circuit to the total count obtained when the reference resistive element is connected to said time constant circuit, with the magnitude of the ratio of the total count obtained when the second photoconductive device is connected to said time constant circuit to the total count obtained when the reference resistive element is connected to said time constant circuit.

2. A circuit for detecting back light comprising:
first photoconductive means responsive to the brightness of a surrounding portion of an object to be photographed for producing a first output signal representative of a first resistance value;
second photoconductive means responsive to the brightness of a central portion of the object for producing a second output signal representative of a second resistance value;
a reference resistive element for producing a third output signal representative of a reference resistance value;
a time constant circuit having a capacitor for determining a time constant and producing an output signal having a duration determined by the time constant;
means for selectively connecting said reference resistive element, said first photoconductive means and said second photoconductive means to said time constant circuit in series with said capacitor;
pulse generating means for generating pulses upon receiving the output signal from said time constant circuit, the number of pulses being determined by the resistance value of said time constant;
counting means for counting the number of pulses delivered from said pulse generating means; and
arithmetic means for comparing the magnitude of the ratio of the total count obtained by said counting means when said first photoconductive means is connected to said time constant circuit to the total count obtained when said reference resistive element is connected to said time constant circuit, with the magnitude of the ratio of the total count obtained when said second photoconductive means is connected to said time constant circuit to the total count obtained when said reference resistive element is connected to said time constant circuit.

3. A circuit for detecting back light according to claim 2; wherein said first photoconductive means and said second photoconductive means are composed of CdS.

4. A circuit for detecting back light according to claim 2; wherein said time constant circuit comprises a one-shot multi-vibrator which includes said capacitor and an inverter to produce pulses of a given duration.

5. A circuit for detecting back light according to claim 2; wherein said time constant circuit comprises a CR oscillator.

6. A circuit for detecting back light according to claim 2; including a switching circuit for effecting discharge of said capacitor.

* * * * *